W. C. A. GRANT.
POWER ATTACHMENT FOR AUTOMOBILES.
APPLICATION FILED SEPT. 22, 1919.
1,371,618. Patented Mar. 15, 1921.
3 SHEETS—SHEET 1.
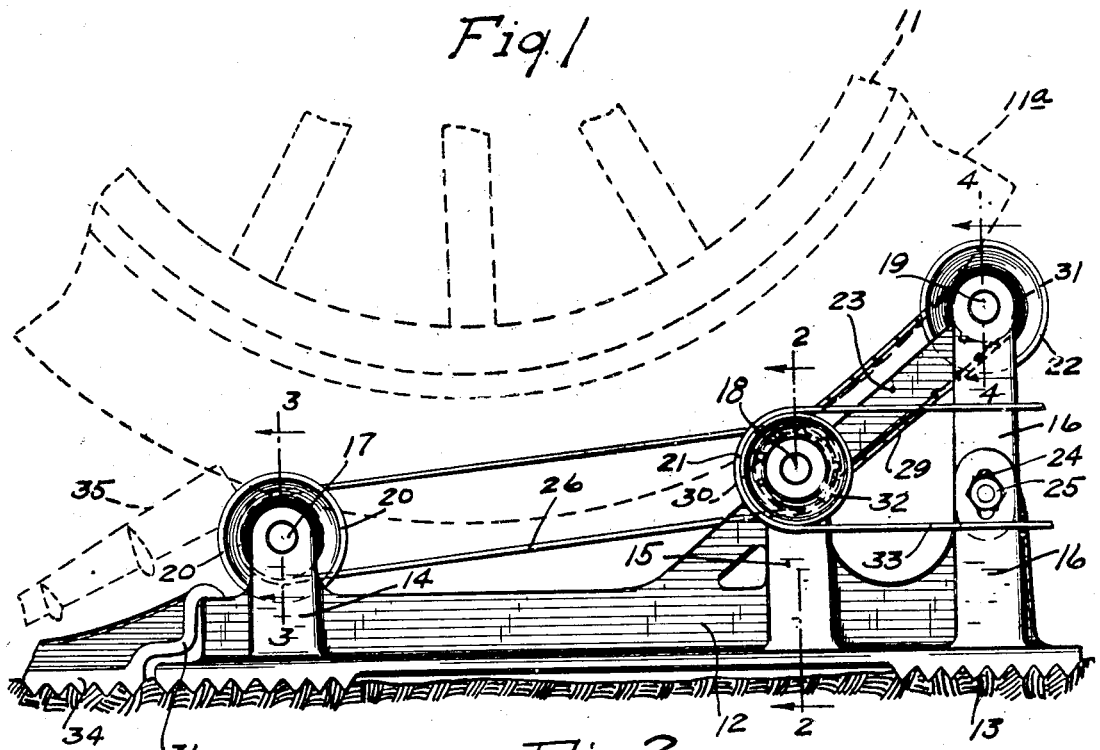
INVENTOR,
William C. A. Grant
BY HIS ATTORNEYS

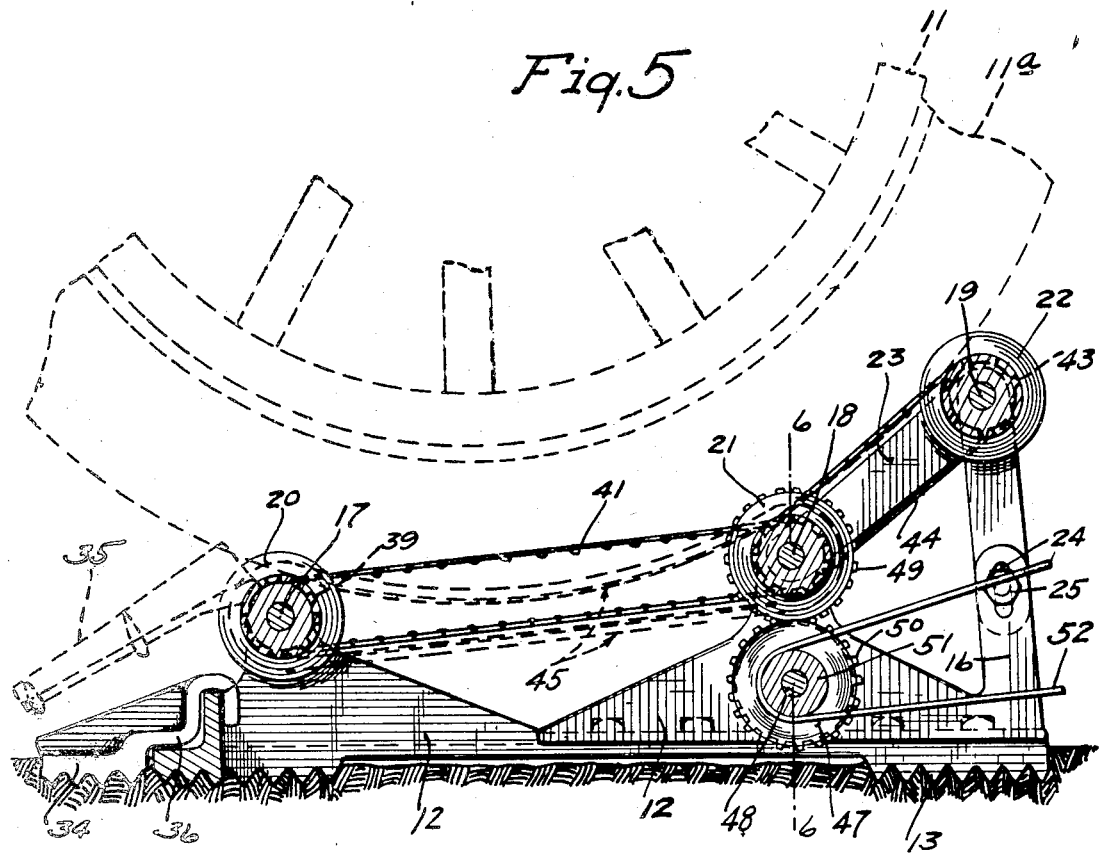
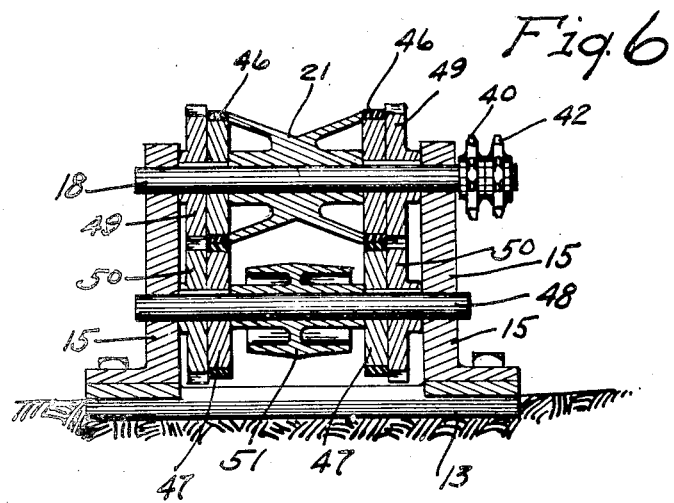

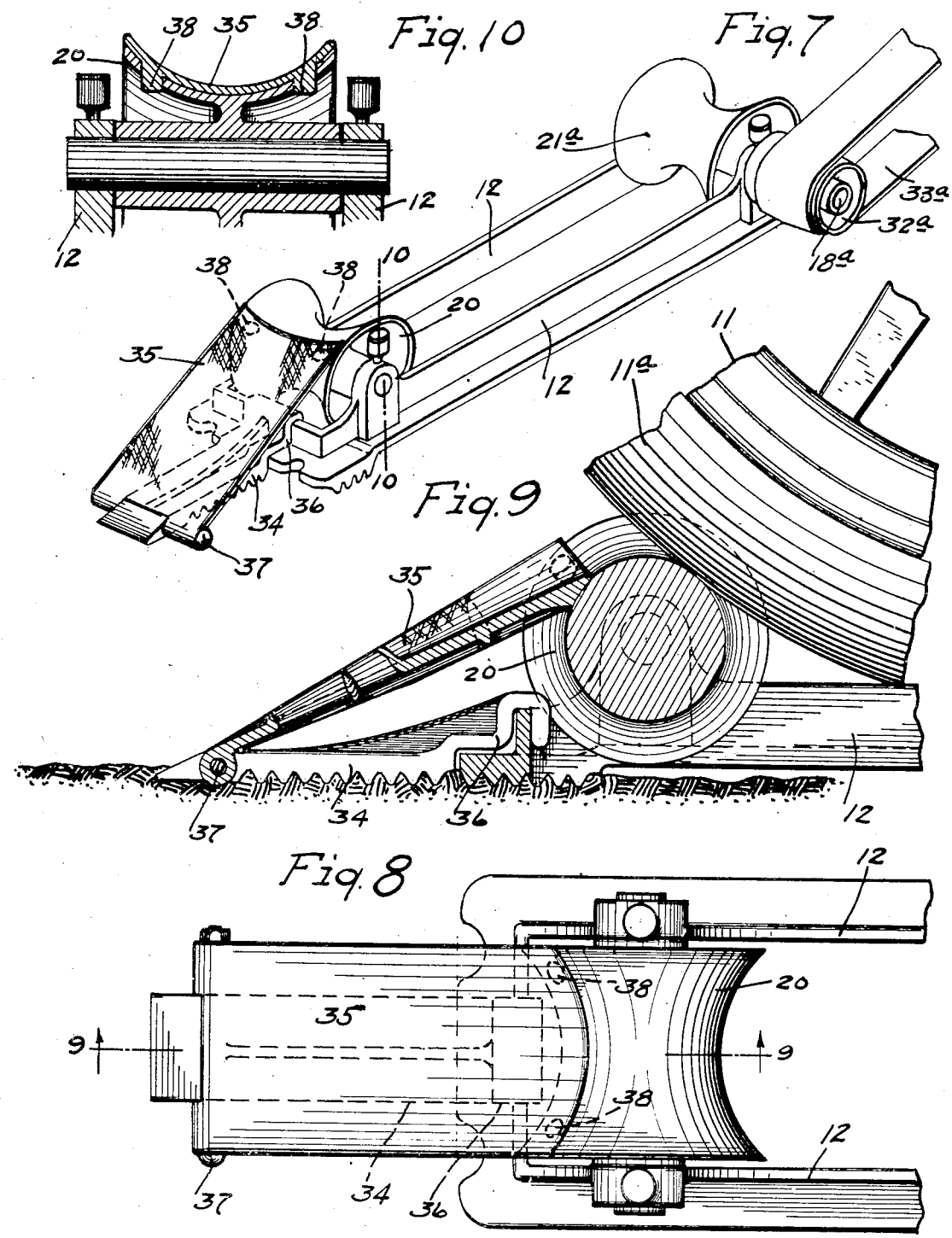

UNITED STATES PATENT OFFICE.

WILLIAM C. A. GRANT, OF WINNIPEG, MANITOBA, CANADA.

POWER ATTACHMENT FOR AUTOMOBILES.

1,371,618.  Specification of Letters Patent.  Patented Mar. 15, 1921.

Application filed September 22, 1919. Serial No. 325,515.

*To all whom it may concern:*

Be it known that I, WILLIAM C. A. GRANT, a subject of the King of Great Britain, residing at Winnipeg, Province of Manitoba, Dominion of Canada, have invented certain new and useful Improvements in Power Attachments for Automobiles; and I do hereby declare the following to be a full, clear, and exact description of the invention, such as will enable others skilled in the art to which it appertains to make and use the same.

My invention has for its object to provide an efficient power attachment for automobiles adapted to be driven by one of the traction wheels of the automobile and to transmit power therefrom for various commercial purposes. Generally stated, the invention consists of the novel devices and combinations of devices hereinafter described and defined in the claims.

Various power attachments have hitherto been provided, in which it was necessary to transmit the power from both traction wheels, but, in accordance with my invention, one of the traction wheels of an automobile may be left on the ground and the power transmitted from the other traction wheel. The term "automobile" is herein used in a broad sense to cover motor-propelled vehicles.

The improved power attachment is illustrated in the accompanying drawings, wherein like characters indicate like parts throughout the several views.

Referring to the drawings:—

Figure 1 is a side elevation showing one form of the power attachment in operative position, the traction wheel being indicated by dotted lines only;

Fig. 2 is a transverse section on the line 2—2 of Fig. 1;

Fig. 3 is a transverse section on the line 3—3 of Fig. 1;

Fig. 4 is a transverse section on the line 4—4 of Fig. 1;

Fig. 5 is a view corresponding to Fig. 1, but illustrating a somewhat modified construction;

Fig. 6 is a transverse section on the line 6—6 of Fig. 5;

Fig. 7 is a perspective view illustrating a still further modified form of the power device, but illustrating the same so-called "approach bracket" structure that is illustrated in Figs. 1 and 5;

Fig. 8 is a plan view of the approach bracket and adjacent end of the frame-work of the power attachment;

Fig. 9 is a vertical section on the line 9—9 of Fig. 8, showing also a portion of the traction wheel; and Fig. 10 is a detail in transverse vertical section on the line 10—10 of Fig. 7.

Referring first to the construction illustrated in Figs. 1 to 4, inclusive, the numeral 11 indicates the traction wheel of the automobile; the numeral 12 indicates a cast frame-work or base that is approximately rectangular in plan view, is adapted to rest upon the ground and is preferably formed with transverse serrations or ribs 13, that anchor the same on the ground against slippage. This frame 12 has three laterally spaced pairs of bearing posts 14, 15 and 16 that are progressively higher in the order stated. In the bearing posts 14, 15 and 16, respectively, are journaled shafts 17, 18 and 19; and between the respective posts said shafts are provided with secured driving rollers 20, 21 and 22. These rollers are all provided with concave peripheries, so that they will closely engage the tread portion of a tire 11ª of the traction wheel 11, and the said rollers, it will be noted in the order named, are from front to rear, or located progressively higher and higher from the ground.

The two shafts 18 and 19 are also journaled in the ends of a pair of laterally spaced links 23; and here it is important to note that the two posts 16 are made vertically adjustable. Said posts 16, as shown, are made vertically adjustable by providing the same with overlapping upper and lower sections having alined slots 24, through which nut-equipped bolts 25 are passed to rigidly secure and hold the posts in set adjustments. The lower sections of said posts 16 are preferably cast integral with the base 12. The links 23 cause the shaft 19 to move on the arc of a circle struck from the axis of the shaft 18.

A belt 26 runs over pulleys 27 and 28, respectively, on the shafts 17 and 18. A sprocket chain 29 runs over sprockets 30 and 31, respectively, on the shafts 18 and 19, and the opposite side of the attachment shaft 18 is provided with a pulley 32 over which a belt 33 may be run to transmit power from the attachment to any kind of a machine that it is desired to drive from the attachment. It is desirable that the traction wheel is capable of being run onto the rollers 20, 21 and 22 without the use of a lifting jack; and hence, I provide a so-called approach bracket, preferably made up of a base 34 and an inclined approach plate 35. The approach base 34 is preferably serrated at its bottom to prevent slipping, and, at its rear end, is formed with a U-shaped hooked portion 36 adapted to be dropped onto and interlocked with the flanged front end of the base 12, as shown in Fig. 1 and also in Figs. 7 and 9. The approach plate 35 is formed at its lower outer end so that it straddles the reduced outer end of the base 36 and is pivotally connected thereto by a hinge bolt or pin 37. At its free upper or inner edge, the approach plate 35 may be made concave, so that it fits against the concave surface of the roller 20, and it is provided with dowel-like pins or studs 38 that are adapted to enter perforations in said roller and to thereby hold said roller against rotation, while the traction wheel is being driven to working position on the several rollers.

As already stated, the approach bracket, which may be common to all of the forms herein shown, is best illustrated in Figs. 7 to 10, in which views only one driving roller 21$^a$ is shown, and, in such arrangement, the traction wheel will rest solely on the two rollers 20 and 21$^a$. The shaft 18$^a$ of this roller 21$^a$ is provided with a pulley 32$^a$, over which a belt 33$^a$ will be run to transmit power from the attachment.

Directing attention now to the form illustrated in Figs. 5 and 6, the same arrangement of rollers 20, 21 and 22 and coöperating shafts and supports therefor, illustrated in Figs. 1 to 4, inclusive, is here employed, but, in this arrangement, the driving connections are somewhat changed as follows:—

The shafts 17 and 18 are provided, respectively, with sprocket wheels 39 and 40, over which a sprocket chain 41 is arranged to run. The shafts 18 and 19 are provided with sprockets 42 and 43, over which a sprocket chain 44 is arranged to run. This connects the three rollers 20, 21 and 22 for common rotation, so that they all act frictionally to transmit power from the traction wheel.

The dotted lines, marked 45 in Fig. 5, illustrate the manner in which an apron may be arranged to run over the rollers 20 and 21, if desired. In this arrangement, the roller 21, at its ends, is provided with peripheral friction flanges 46 that engage peripheral friction wheels 47 on the countershaft 48 journaled in the sides of the base 12 below the shaft 18. The shaft 18 is also shown as provided with spur gears 49 that engage spur gears 50 on the shaft 48, so as to positively connect the two shafts for rotation. Either the friction wheels or the spur gears may be omitted, but both are desirable. Between the friction wheels 47, the countershaft 48 is provided with a pulley 51, over which a belt 52 is adapted to be run to transmit power from the attachment. This arrangement locates the pulley 51 in a plane that is transversely central of the attachment, so that tension on the driving belt 52 does not tend to pull the attachment either toward one side or the other.

The following description of the operation, in respect to the device shown in Figs. 1 to 4, inclusive, will answer also for the description of the operation of the forms shown in Figs. 5 and 6.

By means of the approach bracket, the traction wheel may be easily backed or run onto the three driving rollers 20, 21 and 22, and the upper roller 22 will stop the movement of the traction wheel rearward, and, moreover, will prevent the traction wheel from running off the device, when it is at work.

The preferred manner of using the power attachment would be to place the same between the front and rear wheels on one side with the approach plate 35 under the rear wheel, and then to drive the machine forward far enough to carry the rear wheel onto the rollers 20, 21 and 22. In transmitting power from the machine, the wheel would be then rotated in the direction of the large arrows marked on Figs. 1 and 5, and this will cause the wheel to run against and keep tight contact with the highest roller 22. Of course, the extensible pedestal 16 should be adjusted so as to cause the roller 22 to engage the tire of the wheel when the tire is resting also on the two rollers 20 and 21. In the preferred arrangement illustrated, all three of the rollers act tractively on the tire and the upper roller serves to prevent the wheel from running off from the rollers. Hence, this upper roller is important even when not used as one of the driving rollers of the attachment.

As is evident, the power attachment of the above character is not only cheap to make and efficient in action, but the automobile may be rendered operative thereon by the simplest possible kind of an action, to wit, simply by driving one of the traction wheels of the automobile onto the same. This leaves the other traction wheel on the ground where it will afford a base of reaction for the transmission of power through the differential gear mechanism with a multiplied speed to the power attachment.

What I claim is:

1. A power attachment for automobiles comprising a ground-engaging base, three wheel supporting rollers journaled to said base, one of the end rollers being at a materially greater elevation than the other two, means for transmitting power from certain of said wheel supporting rollers, and means for vertically adjusting the said relatively high end roller to adapt the three rollers to engage wheel tires of different diameter.

2. A power attachment for automobiles comprising a ground-engaging base, three wheel supporting rollers journaled to said base, means for vertically adjusting one of said end rollers and for holding the same higher up than the other two rollers, links causing said adjustable end roller to move on the arc of a circle struck from the axis of the intermediate roller, driving mechanism connecting said intermediate and vertically adjustable end roller, and means for transmitting power from said intermediate roller.

3. A power attachment for automobiles comprising a ground-engaging base, three wheel supporting rollers journaled to said base, means for vertically adjusting one of said end rollers and for holding the same higher up than the other two rollers, links causing said adjustable end roller to move on the arc of a circle struck from the axis of the intermediate roller, driving mechanism connecting said intermediate and vertically adjustable end roller, means for transmitting power from said intermediate roller, and driving connections between said intermediate roller and the other end roller.

4. A power attachment for automobiles comprising a ground-engaging base, a plurality of wheel supporting rollers journaled on said base, a pulley located directly under one of said wheel supporting rollers and having driving connections therewith, and a belt running over said pulley and exerting a central pull on said base.

5. A power attachment for automobiles comprising a ground-engaging base, a plurality of wheel supporting rollers journaled on said base, means for transmitting power from certain of said rollers, and an approach bracket detachably connected to one end of said base and having an oblique plate leading from the ground to the adjacent roller, the upper edge of said oblique plate having interlocking engagement with the said engaged roller.

6. A power attachment for automobiles comprising a ground-engaging base, a plurality of wheel supporting rollers journaled on said base, means for transmitting power from certain of said rollers, and an approach bracket detachably connected to one end of said base and having an oblique plate leading from the ground to the adjacent roller, said oblique plate being pivotally connected to the base portion of said approach bracket and having interlocking engagement with the engaged roller.

7. A power attachment for automobiles comprising an approximately rectangular ground-engaging base, a plurality of wheel supporting rollers journaled to said base, means for transmitting power from said rollers, and an approach bracket comprising a ground-engaging base member and an oblique plate pivoted thereto, the former having a detachable interlocking engagement with the end of said base frame, and the latter having detachable interlocking engagement with the adjacent roller.

In testimony whereof I affix my signature in presence of two witnesses.

WILLIAM C. A. GRANT.

Witnesses:
BERNICE G. BAUMANN,
HARRY D. KILGORE.